Jan. 12, 1943.　　H. F. McLOUGHLIN ET AL　　2,308,433
ELECTRIC SWITCH
Filed Aug. 13, 1941　　7 Sheets-Sheet 1

INVENTORS
Harold F. McLoughlin
and Walter E. Hill,
Smith, Michael & Gardiner, ATTORNEYS Jan. 12, 1943.  H. F. McLOUGHLIN ET AL  2,308,433
ELECTRIC SWITCH
Filed Aug. 13, 1941  7 Sheets-Sheet 2
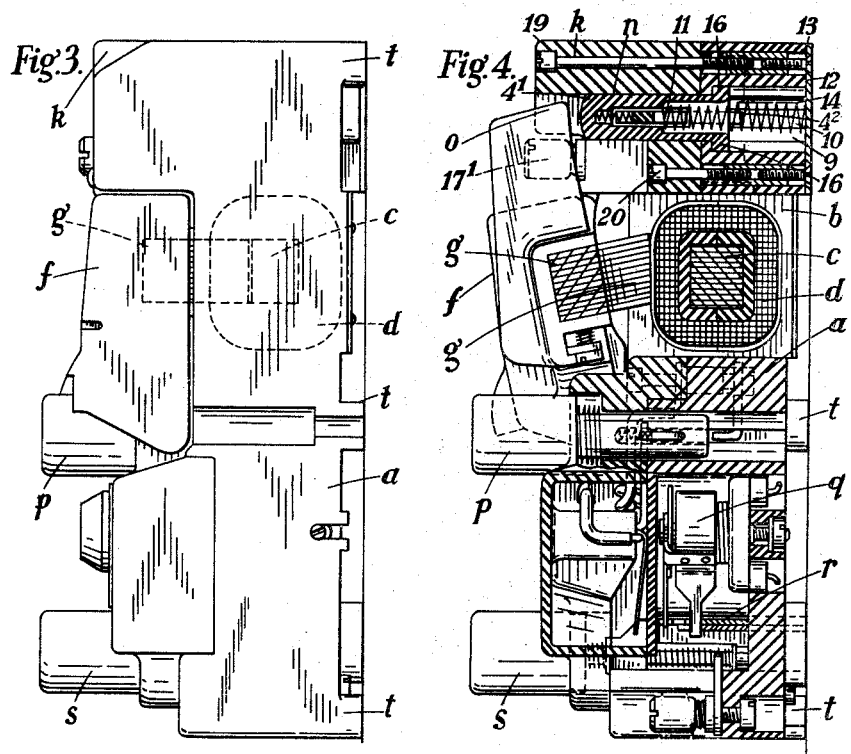
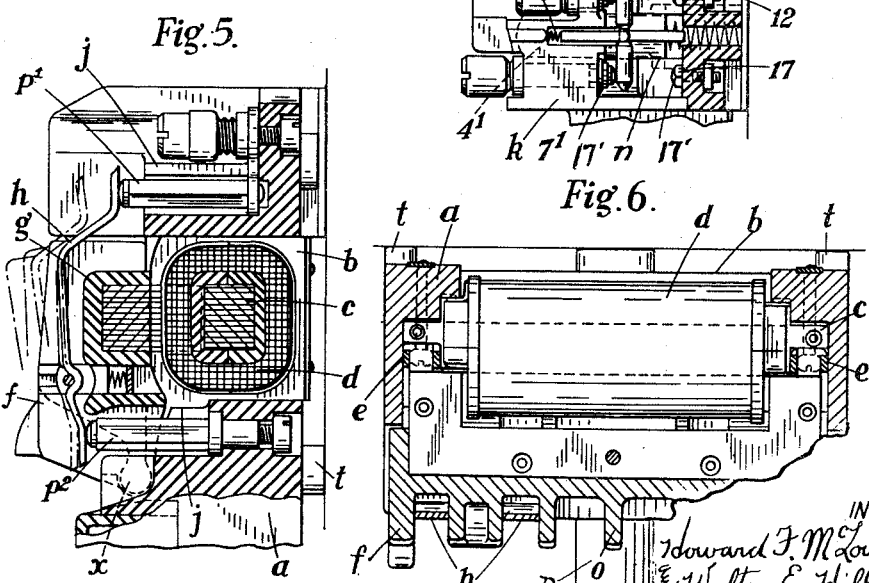
INVENTORS
Howard F. McLoughlin,
& Walter E. Hill,
By Smith, Michael & Gardiner,
ATTORNEYS

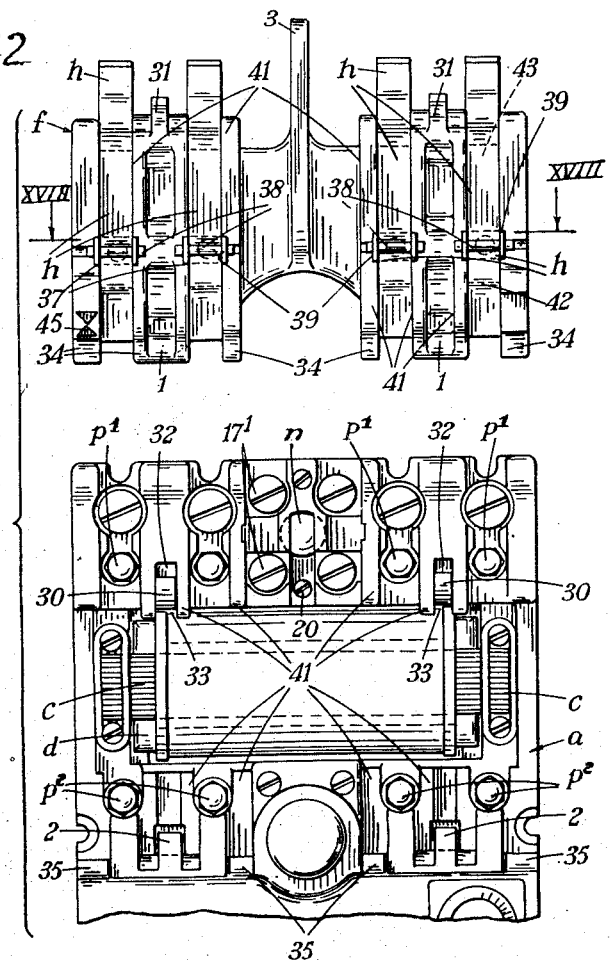

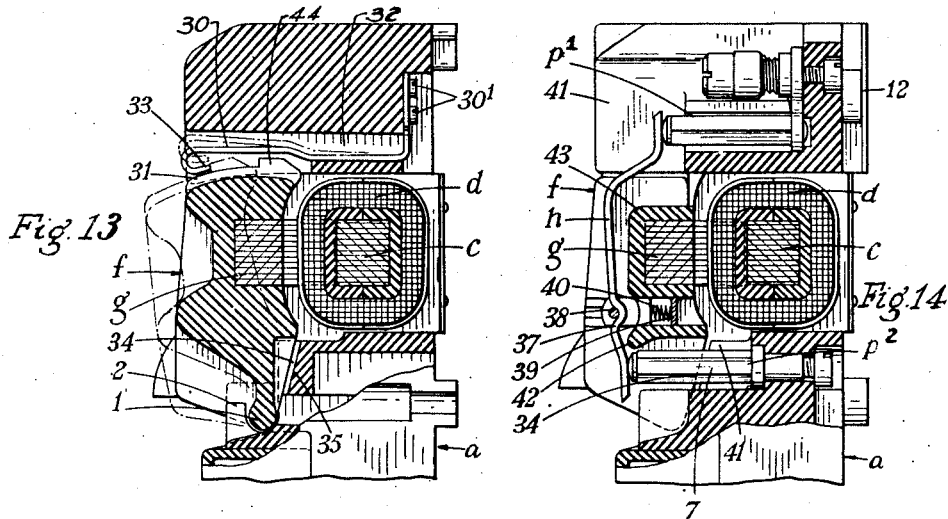
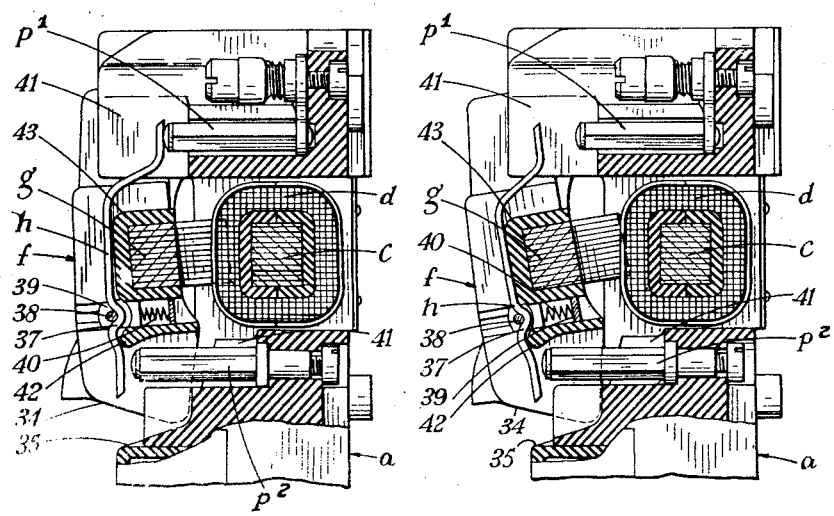

Jan. 12, 1943.     H. F. McLOUGHLIN ET AL     2,308,433
ELECTRIC SWITCH
Filed Aug. 13, 1941     7 Sheets-Sheet 7
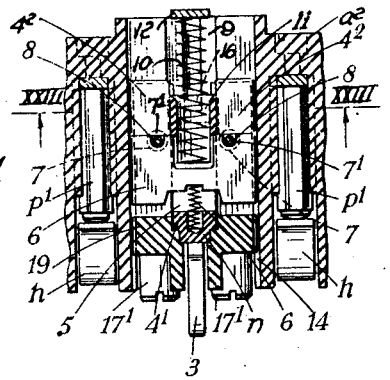
Fig. 21.
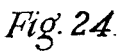
Fig. 24.
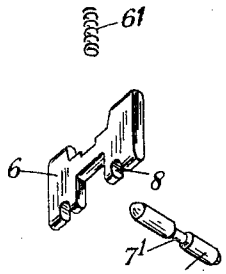
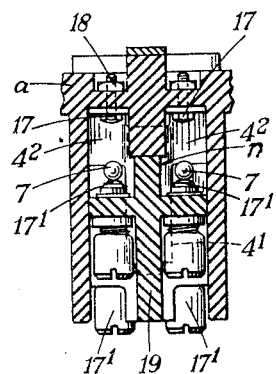
Fig. 22.
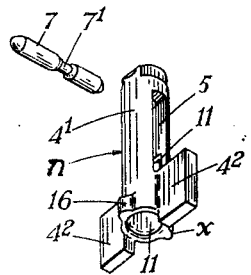
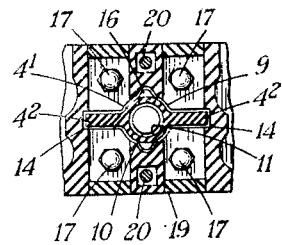
Fig. 23.
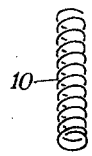
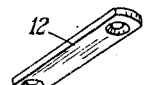
Inventors
Harold F. McLoughlin and Walter E. Hill
by
Smith, Michael and Gardiner,
Attorneys Patented Jan. 12, 1943

2,308,433

UNITED STATES PATENT OFFICE 2,308,433

ELECTRIC SWITCH

Harold Fletcher McLoughlin, Shenstone Court, near Lichfield, and Walter Edward Hill, Streetly, England Application August 13, 1941, Serial No. 406,712
In Great Britain August 12, 1940

10 Claims. (Cl. 200—6)

This invention relates to improvements in and connected with, automatically released electric switches and is more particularly concerned with a motor protective switch, comprising a magnet associated with a clapper armature for operating the switch contacts. The principal object of the invention is to provide an improved arrangement of simple and compact construction composed of relatively few parts adapted to be economically produced.

A further object of the invention is to enable easy access to the coil of the magnet and to the fixed contacts while facilitating assemblage of the parts. A still further object is to reduce wear on the contacts and to obtain in a simple manner a two-stage separating gap between them when the circuit is opened. Another object of the invention is to reduce wear on the contacts while ensuring adequate contact pressure with freedom from undesirable vibration between them. Yet another object is to provide an improved arrangement of compact construction for mounting the magnet and coil in such manner as to enable quick assemblage and detachability of the parts while ensuring self-aligning characteristics of the armature with the magnet, such arrangement providing an efficient magnet system which minimizes any tendency to hum, effects an economy in the iron employed, and enables the pole faces to be easily ground.

According to this invention a flat base composed of insulating material is chambered or recessed for the mounting of the magnet structure and release devices, which are adapted to be readily withdrawable for inspection and examination from the front of the base. The fixed contacts, terminal connections and the axes of thermal release devices are preferably disposed perpendicularly to the plane containing the base and are accommodated in recesses which enable access for wiring to be obtained from the rear while assemblage and detachment for inspection may be effected from the front. The disposition of the parts as aforesaid, and the mounting of the push buttons so as to be movable perpendicularly to the plane of the base, enables a very compact construction occupying a small space to be realised. The recessing of the base or block unit is such as to enable the parts to be contained substantially within its depth, thereby contributing to the attainment of a desirably shallow construction. The magnet and its coil, disposed in the lower part of a recess, may co-operate with a clapper armature mounted on an insulating carrier pivotally mounted across the mouth of the recess. Moving contact strips may be mounted between ribs on such carrier, the complementary fixed contacts being in the form of pillars disposed within openings disposed perpendicularly to the plane of the base. Similarly, the start and stop push buttons and the moving contacts for making and breaking the auxiliary or additional circuits act in a direction perpendicular to such plane. Thus the principal moving parts move in the same general direction relatively to the base thereby resulting in an important economy in the space occupied by such parts.

The improved arrangement thus provides for an air break switch a shallow construction in which the co-operating parts are assembled in a very compact manner on a base unit preferably made of a moulded material such as synthetic resin. According to a further feature of the invention, the vertically disposed base is constructed for receiving the magnet and armature in its upper portion and the release devices in its lower portion. Thus the magnet chamber is advantageously situated for the convection of heat away from the release devices, the walls of the recesses or chamber affording advantageous heat insulating barriers. The auxiliary contacts are preferably disposed immediately above the magnet so as to be operated by the upper end of the carrier for the armature and the moving contacts, the carrier being pivotally mounted at its lower end in such manner as to be readily removable from the base.

The magnet and its coil may be mounted on the semi-resilient base by means of shading devices, which are preferably detachable from the magnet core and are held in position by fixing screws. The rigid attachment of the magnet and coil to such a base, ensures that the shading means cannot work loose during successive operations of the switch, and the semi-resilient characteristics of the base minimise any tendency to hum. The arrangement also permits of a very close fit of the magnet core in the coil former while facilitating the threading of the coil over the core and providing an advantageous space factor for the winding.

The core may be in the form of a straight bar extending through the coil and having ground faces at its ends co-operating with the extremities of a U-shaped armature. An air gap may be provided in the length of the magnet of the armature, for example in the middle of the length of the former. The improved arrangement enables the faces on the respective parts to be disposed in the same plane, thereby facilitating the grinding of the pole faces. In addition the air gap of unchanging dimensions enables the advantages accruing from the employment of opposed E-shaped parts to be realised with a construction which requires only a relatively small amount of metal. The armature is preferably mounted in a pivotal member carrying the moving contacts so as to be capable of self-alignment therein, and in such manner as to be readily detachable therefrom. The fixed magnet structure being rigidly mounted on the base enables the instantaneous self-alignment of the armature therewith in switching operations.

Each moving contact may be in the form of a strip movable so as to provide a small separating gap between a fixed contact and one end thereof, and an enlarged isolating gap between its other end and a second fixed contact, when the switch is operated for opening the controlled circuit. The two-stage separation obtained in this manner reduces wear on the contacts and enables their life to be materially increased. A spring for resiliently mounting each moving contact strip on the pivotally mounted armature carrier is adapted also for imparting an initial positive movement to such contact when opening the circuit and for providing the pressure between the contacts when the circuit is established. The resilient pressure obtained in this manner permits the employment for the moving contact of relatively heavy unflexing strip metal.

The carrier for the moving contacts and armature may be formed with integral hinge-like parts to enable the carrier to be pivotally mounted on the base, without the employment of separate securing means. Thus the lower end of the carrier may be formed with bead-like formations adapted to co-operate with a complementary upturned hook or hooks on the base, a spring being operative on the upper surface of the carrier for resiliently seating the parts so that the carrier is interlocked with the base. Each moving contact may be removably clipped in position on the carrier, and upon a switching operation for opening the circuit, may be displaced by a formation on the carrier for providing the micro break at one fixed contact, followed by the enlargement of the separation for isolation, by displacement of the moving contact from the second fixed contact. The carrier may also be formed with an extension, for causing operation, through a push button or plunger, of the additional or auxiliary contacts which may be employed for any desired purpose such as for effecting the change from star to delta connections, or for the operation of auxiliary circuits. A spring associated with this push button or plunger serves for resisting the movement of the carrier when the armature is attracted to the magnet and thereby prevents too rapid closing of the contacts with consequent reduction in contact chatter and wear. Such spring also ensures opening of the contacts in spite of any remanent magnetism in the armature and the core, or in the case of reduced voltage. The plunger may operate in a cylinder adapted to afford a pneumatic cushioning to assist the action of the spring in resisting too rapid closing of the contacts. The upper surface of the pivotal carrier is preferably formed with an arcuate surface adapted to co-operate with a blade spring bearing thereon for assisting the damping of vibrations of the contacts and for imposing a retardation on the opening thereof.

In order to enable the invention to be readily understood reference will now be made to the accompanying drawings illustrating by way of example one construction of a motor protective switch embodying the present improvements in which drawings:

Figure 3 is a side elevation of the switch in the "on" position;

Figure 4 is a central vertical section of the switch in the "off" position;

Figure 5 is a central vertical section of the upper part of the switch when in the "on" position;

Figure 6 is a plan section illustrating the magnet mounting;

Figure 7 is a central vertical section of the auxiliary contact mechanism;

Figure 12 is a front elevation, the lower part of which illustrates the base while the upper part illustrates the carrier pivotally mounted thereon;

Figures 13 and 14 are sections respectively on the lines XIII—XIII and XIV—XIV, of Figure 1;

Figures 15 and 16 are views similar to Figure 14 illustrating the two-stage separating gap between the contacts upon a switch operation for opening the circuit;

Figure 21 is a plan section of the auxiliary contact mechanism, and a section on the line XXI—XXI of Figure 1;

Figure 22 is a section on the line XXII—XXII of Figure 1;

Figure 23 is a section on the line XXIII—XXIII of Figure 21;

Figure 24 is an exploded perspective view of the auxiliary contact mechanism.

Figure 1:
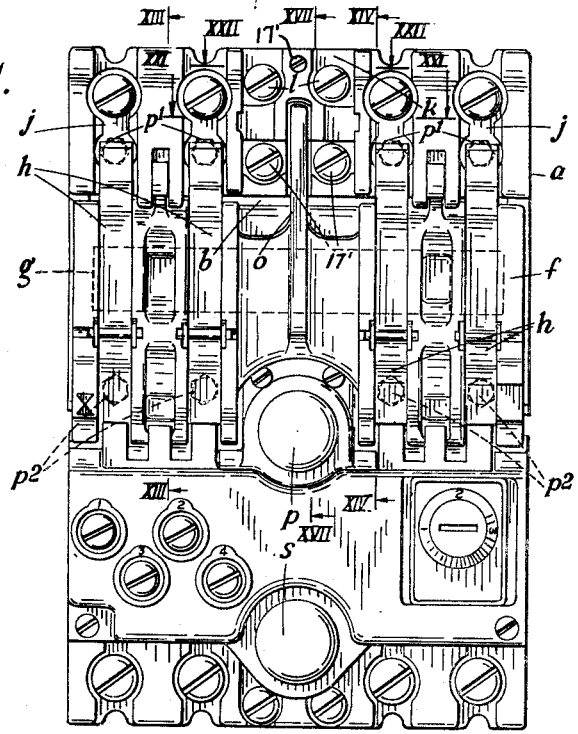
Figure 1 is a front elevation.
Figure 2:
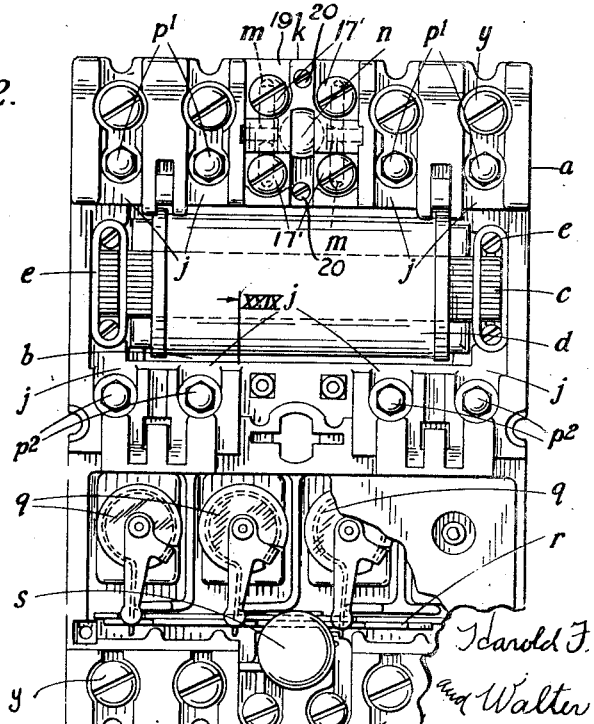
Figure 2 is a view similar to Figure 1 parts being removed to disclose certain elements more clearly.
Figure 9:
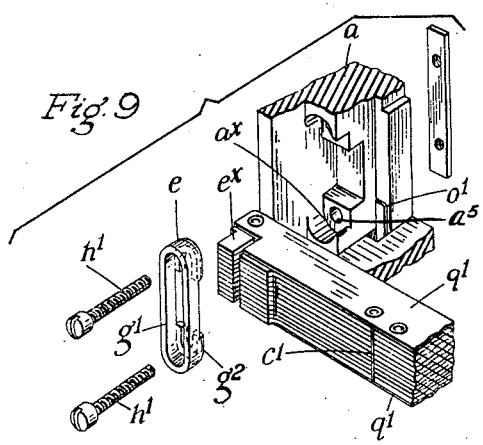
Figure 9 is an exploded perspective view illustrating the parts of the magnet mounting.
Figure 8:
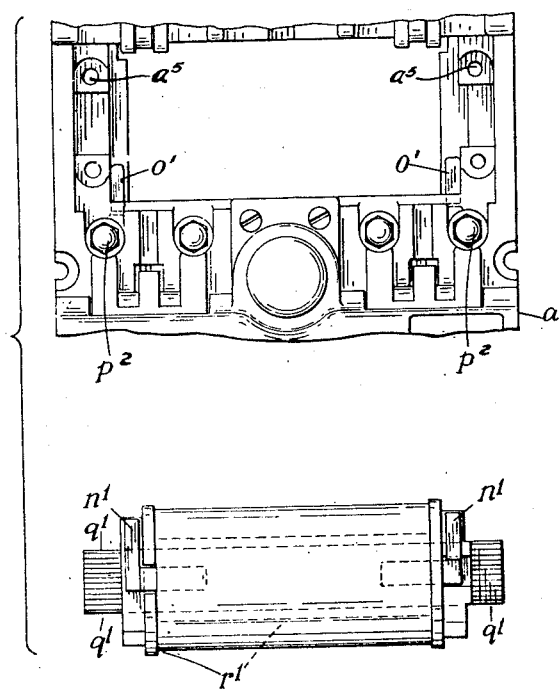
Figure 8 shows front elevations of the base and magnet structure.
Figure 10:
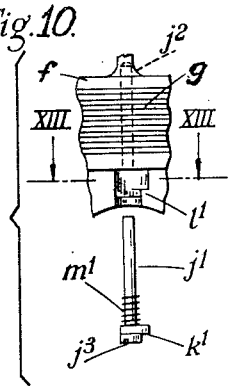
Figure 10 is a fragmentary view of the mounting means for the armature.
Figure 11:
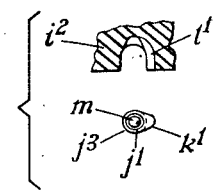
Figure 11 is a section on the line XI—XI of Figure 10.
Figure 17:
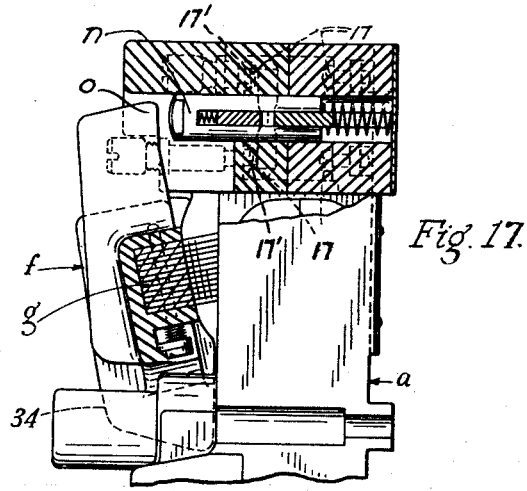
Figure 17 is a section on the line XVII—XVII of Figure 1.

Referring more particularly to Figures 1–7 of the drawings, a substantially flat base $a$ of rectangular configuration made by moulding from synthetic resin, is formed in its upper portion with a deep recess $b$ in which is transversely disposed a laminated magnet core $c$ extending through a coil $d$, the structure being secured in position by shading devices $e$. Each shading device is of somewhat trough shape, its side walls $g^1$ being engageable over an end portion $e^x$ of the magnet while the ends of the arcuate flanges $g^2$ butt against the side plates of the laminations. The rounded ends of the shading device are accommodated in an appropriately shaped recess $a^x$ in the base $a$, which is tapped at $a^5$ for receiving securing screws $h^1$. The heads of the latter seat on the faces of the flanges $g^2$ when the parts are assembled. The armature $g$ may be secured in a pivotal moving contact carrier $b$, made of insulating material, by means of a pin $j^1$ the stem of which extends freely through a hole $j^2$ in the armature. Thus the head $j^3$ of the pin is formed with a pear-shaped lobe $k^1$ engageable, on rotation of the pin, with a ledge $l^1$ on the carrier for maintaining a short helical spring $m^1$ in compression between the head and a wall of the carrier. The arrangement enables the armature to be floatably mounted so as to be self-aligning in different planes with the rigidly mounted magnet structure.

The magnet may be formed with terminal blades $n^1$ engageable with flexible connector blades $o^1$ extending from pillar-like contacts $p^2$ carried by the base.

The magnet core laminations may be secured by brass side plates $q^1$ so as to provide an air gap $c^1$ midway of their length. In assemblage the magnet is inserted into the recess or opening $b$ of the base and is secured at each end by the shading devices $e$ disposed in the seatings $a^x$ in the base or block, thereby enabling the coil to be very easily changed.

In the mouth of the recess $b$ there is disposed an insulating carrier $f$ pivotally mounted at its lower edge to the base $a$ and floatably supporting on its inner face the armature $g$ for co-operating with the magnet. Parallel moving contact strips $h$ disposed in a vertical direction are removably mounted on the outer surface of the carrier, each of the strips being adapted to co-operate at its upper and lower ends with pillar-like fixed contacts $p^1$ $p^2$ disposed in openings $j$ in the base and in a direction perpendicular to the plane thereof. The upper set of fixed contacts $p^1$ are disposed in pairs on each side of a central chamber $k$ for accommodating fixed auxiliary or additional contacts 17, 17¹ engageable with moving contacts 7, 7, mounted on a spring-pressed plunger $n$ actuated by a nose formation $o$ on the upper edge of the carrier $f$, such plunger being movable together with its contacts in a direction perpendicular to the plane of the base. The lower set of fixed contacts $p^2$ are likewise disposed in pairs on either side of a start push button $p$ disposed centrally of the base. It is to be noted that the carrier $f$, which is adapted to impart a microbreak between the moving contact $h$ and the lower set of fixed contacts $p^2$ followed by an isolating gap of large dimensions at the upper set of contacts $h$, $p^1$ is pivotal about its mounting $x$ in a plane perpendicular to the plane of the base.

In its lower portion the base $a$ is chambered to form compartments for the mounting of thermally sensitive overload release devices in the form of bimetal elements $q$ of partly cylindrical form, the axes of which are disposed perpendicular to the base and which are adapted for actuating the trip bar $r$ arranged transversely across the lower part of the base. Centrally of this part is a resetting push button $s$. The improved arrangement provides for complete accessibility for wiring from the front, while enabling interconnection cables to be accommodated and connected from the rear. For this purpose the flat rear surface of the base may be formed with ribs or feet $t$ which provide spaces or channels for such inter-connection cables.

It is to be noted that the axes of the resetting button $s$ and the start button $p$ are disposed perpendicularly to the plane of the base $a$. Furthermore, the various terminals $y$ are likewise disposed perpendicularly to the base, while the various parts are accommodated in recesses so as to be disposed within the depth of such base for the purpose described.

Figure 18:
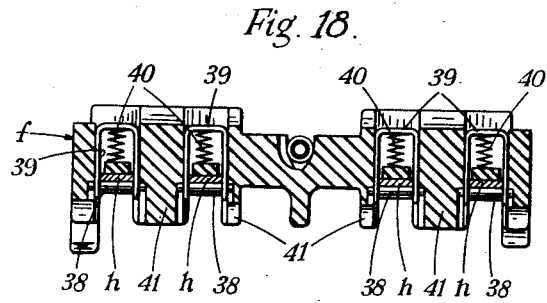
Figure 18 is a section on the line XVIII—XVIII of Figure 12.

Bead-like formations 1 on the lower edge of the carrier $f$ are pressed, by blade springs 30 acting on an arcuate upper surface 31 of the carrier, against hook-like formations 2 on the base $a$. Each blade spring 30 secured by screws 30¹ to the base $a$, is disposed in an enlarged opening 32 therein and is formed with an inturned rounded end 33 engaging with the arcuate upper surface 31 of the carrier. The latter has an upwardly inclined wall 34 co-operating with a similarly inclined surface 35 at the lower end of the base and to the rear of the pivot mounting 36. Thus the spring causes the carrier to be seated in position while the enlarged opening enables the springs 30 to be flexed upwards to permit withdrawal of the carrier from the base, by lifting the beaded edges 1 from the trapping space afforded by the hooks 2 and the inclined wall 35 of the base. In this manner the parts may be readily assembled, and dismantled to enable access to be obtained to the magnet structure when it is desired to change the coil $d$ for different voltages or frequencies. In addition such arrangement facilitates inspection and replacement of the fixed contacts $p^1$ $p^2$ mounted on the base. Each moving contact strip $h$ is formed near its lower end with a depression 37 in which is adapted to be seated a pin 38 connecting the arms of a U-shaped holder 39 embracing the web portion B of the carrier and holding a spring 40 operative between its connecting limb and the carrier. In assemblage, the spring 40 is inserted in a chamber in the rear face of the carrier and seated upon the web B and the holder 39 is passed over the web of the latter, the legs of the U-shaped holder extending through appropriate apertures provided in the carrier on opposite sides of the web, as clearly shown in Figs. 15, 16 and 18. The pin is then passed through aligning holes in the arm of the holder, and the shaped lower end of the strip $h$ is introduced between the pin 38 and the carrier until the depression 37 therein is engaged by the cross pin 38 for resiliently securing the contact. The carrier is formed with parallel ribs 41 disposed between the strips for affording arcing barriers between the respective poles. It is to be noted that each cross pin 38 is disposed near the lower end of a moving contact $h$ for the purpose hereinafter described, and is insertible only from one direction so as to be confined to the space between adjacent ribs, thereby eliminating the possibility or arcing.

The front surface of the carrier is formed at its upper and lower ends with forwardly projecting humps 42, 43 adapted for successive engagement with the moving contact strips $h$ in such manner that pivotal movement of the carrier from the position shown in Figure 5 for opening the circuit first causes the lower end of a strip to be separated from its lower fixed contacts $p^2$ to provide a small separating gap (see Figure 15), followed by a displacement of the upper end from its complementary fixed contacts $p^1$ to provide an enlarged isolating gap in the circuit as seen in Figure 16.

Figure 19:
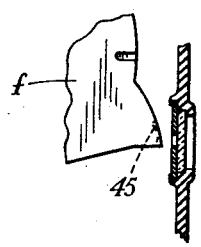
Figures 19 and 20 are fragmentary views of an "on" and "off" indicator.
Figure 20:
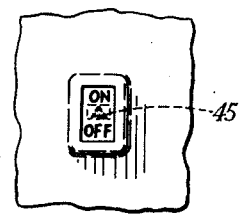

The spring pressed plunger $n$ for actuating additional or auxiliary contacts 7, 7, not only prevents undesirably rapid engagement of the moving and fixed contacts, but also tends to separate the contacts when breaking the circuit. This action is initially assisted by the compression spring 40 disposed in the U-shaped holders 39. In addition the action of the blade spring 30 on the arcuate surface of the carrier and the mounting of the moving contact in the latter, contribute to the elimination of any chatter or vibration between the contacts when the circuit is made, thereby minimizing arcing and increasing the life of the contacts. The upper end of the carrier may be formed with a raised formation 44 constituting a stop for engagement with the inturned end of the blade spring 30 to limit the outward pivotal movement of the carrier and its associated contacts. In addition, the carrier may be formed with an embossing 45 (Figures 19 and 20) adapted for co-operation with appropriate markings to afford indications as to whether the switch is "on" or "off".

The upper edge of the carrier is formed with a nose or projection $o$ adapted for engagement with the plunger $n$ disposed between two pairs of upper fixed contacts $p^1$. The stem $4^1$ of the plunger is formed with lateral wings $4^2$ and has a transverse slot 5 for receiving a mounting plate 6. The moving contacts 7 are held in position between the wings $4^2$ and the plate 6 by means of a spring $6^1$ disposed in a bore of the stem 4, this spring causing each contact to be trapped in position between the wings and the plate. For this purpose each contact 7 is formed with a circular groove $7^1$ engageable by the wings and the plate, the latter having semi-circular openings 8 embracing such grooves. The plunger, together with its assembled contacts and plate 6, is introduced through an opening 9 at the rear of the base, a helical compression spring 10 urging the plunger into engagement with the projection $o$ on the carrier $f$. One end of the spring 10 enters a bore 11 in the plunger while its other end bears on a plate 12 secured to the rear of the base by screws 13. The plunger is slidable with guidance obtained by the engagement of the edges of the wings $4^2$ and the plate 6 in groove 14 in the walls 15 of the base, and by virtue of rib formations 16 on the stem of the plunger entering grooves in the base.

The moving contacts 7 are adapted for engagement with either of the four sets of fixed contacts 17 or $17^1$. The contacts 17 extend through the base and are secured in position by nuts 18, while the contacts $17^1$ are mounted on an insulating member 19 adapted to be secured by screws 20 to the base. This member is formed with a slot through which the projection $o$ can extend into engagement with the head of the plunger $n$. The fixed contacts 17, $17^1$ are disposed in opposed relation so that when the magnet $c$ is energised to cause the attraction of the carrier $f$ the plunger is forced inwardly against the action of the spring 10 to disengage the moving contacts 7 from the fixed contacts $17^1$ and to engage them with the base contacts 17. Such spring projects the plunger outwardly thereby causing retraction of the carrier and its armature, when the magnet is deenergised, the contacts 7 then being engaged with the fixed contacts $17^1$. The latter may be provided with extended lateral strips so that operation of the plunger causes any desired switching operation for example so that the contacts are made when the switch is in the "on" or "off" position.

From the foregoing description it will be apparent that when the magnet $c$ is energized the armature $g$ is drawn from the position shown in Fig. 16 toward the position shown in Fig. 14, the armature carrying the carrier $f$ with it to bring the contact bars $h$ into engagement with the respective stationary contacts $p^1$ $p^2$. During the initial movement of the carrier from the position shown in Fig. 16 to that shown in Fig. 15, it will be noted that the upper end of the contact bar $h$ engages its associated stationary contact $p^1$ prior to engagement of the lower end of the contact bar $h$ with its lower stationary contact $p^2$. In this position of the switch, it will be noted that the lower abutment 42 is in engagement with the contact bar below the pivot pin 38 of the bar and between said pivot pin and the lower stationary contact $b^2$. As the switch moves to final position, such as shown in Fig. 14, the springs 40 are compressed with the result that the pins 38 and the pin carriers 39 slide within their respective guide grooves to move the pivot pins 38 nearer the outer front face of the carrier and out of engagement with the abutments 42 and 43 so that both ends of the carrier bars engage their respective stationary contacts. On deenergizing the electromagnet $c$ the reverse action takes place, as illustrated in Figs. 14, 15 and 16, namely, the abutment 42 will engage the lower end of the contact bar $h$ as shown in Fig. 15 to move it out of engagement with the stationary contact $p^2$ before the upper end of the bar $h$ moves clear of the stationary contact $p^1$, thus giving the desirable sequential breaking of the lower and upper contacts. As shown in Fig. 16, when the switch is open and the parts at rest, contact bar $h$ engages the abutments 42 and 43 on opposite sides of the pivotal axis of the pins 38 under the compressive force of the springs 40 operating between the body of the carrier and the connecting bridge of the U-shaped pin supports 39.

What we claim is:

1. A switch comprising a base of insulating material having a chamber opening through the front face of the base, a contact carrier pivotally supported on the base to overlie the open front of said chamber, contact bars carried by said contact carrier and extending transversely of the pivotal axis thereof, stationary contacts mounted on said base, said stationary contacts being disposed in pairs, the contacts of respective pairs being positioned to operatively engage opposite ends of the respective contact bars of the carrier when the carrier is moved to switch-closing position, and means for pivotally supporting the contact bars on the carrier for rocking movement intermediate their ends and about an axis substantially parallel to the pivotal axis of said carrier whereby when the carrier is moved to open switch position, one end of each of said contact bars will disengage its associated stationary contact before the other end thereof disengages its associated contact.

2. A switch comprising a base of insulating material having a chamber opening through the front face of the base; spaced, upwardly-open bearing lips carried by the base adjacent one edge of the chamber and defining a pivotal axis, a movable contact carrier having contacts mounted thereon, fulcrum members carried by said carrier and disposed within the said bearing lips, said carrier overlying the open front of said chamber, stationary contacts mounted on the base in cooperative relation to the contacts on the carrier, spring means mounted on the base along the opposite longitudinal edge of said chamber and disposed to expand in a direction generally toward the upwardly open portions of said bearing lips, and an arcuate cam surface carried by the contact carrier in opposed relation to said spring means and engaged thereby to resiliently maintain the contact carrier operatively within said bearing lips.

3. A switch comprising a base of insulating material having a chamber opening through the front face of the base, spaced upwardly-open bearing lips carried by the base adjacent one edge of the chamber and defining a pivotal axis, a movable contact carrier having contacts mounted thereon, fulcrumed members carried by said carrier and disposed within the said bearing lips, said carrier overlying the open front of said chamber, stationary contacts mounted on the base in cooperative relation to the contacts on the carrier, spring means mounted on the base along the opposite longitudinal edge of said chamber and disposed to expand in a direction generally toward the upwardly open portions of said bearing lips, an arcuate cam surface carried by the contact carrier in opposed relation to said spring means and engaged thereby to resiliently maintain the contact carrier operatively within said bearing lips, a plunger carried by the base at a point remote from the pivotal axis of the carrier, spring means for urging said plunger upwardly in a direction perpendicular to the plane of the base, and a lug carried by said carrier and engaging said plunger whereby to resiliently resist closing movement of the carrier.

4. A switch comprising a base of insulating material having a chamber front opening through the front face of the base, stationary contact members carried by the base, means defining a pivotal axis, a contact carrier mounted for pivotal movement about said axis and carrying contact bars, and means for rockingly mounting said contact bars on said carrier for rocking movement about an axis parallel to the pivotal axis of the carrier, said mounting means including pivot pins and spring members for resiliently mounting the contact bars in pivotal engagement with said pins, together with means for mounting the pins for limited movement in a direction substantially perpendicular to the plane of the carrier, the rocking axis of said contact bars and said stationary contacts being disposed so that as the carrier moves to open position, one end of each bar will disengage its associated contact prior to the disengagement of the opposite ends of the respective bars with their associated stationary contacts.

5. A switch including a base, a contact carrier pivotally mounted on the base, stationary contacts on said base, a movable contact bar mounted on the carrier for rocking movement about an axis substantially parallel to the pivotal axis of the contact carrier, movable pivot means for rockingly supporting the contact bar on said carrier, guide means for said pivot extending transversely of the plane of said carrier, and spring means urging said pivot and contact bar towards the stationary contacts whereby, when the contact carrier moves to closed switch position said movable contact bar is resiliently engaged with said stationary contacts under the compressive force of said spring.

6. The switch described in claim 5, wherein said stationary contacts are disposed on said base at different distances from the pivotal axis of said contact carrier, and project from the base to different heights so that on release movement of the carrier the opposite ends of said contact bar will break contact with the respective stationary contacts in sequence.

7. The switch described in claim 5 wherein a pair of abutments are provided on said carrier, said abutments respectively engaging said contact bar intermediate the ends thereof and on opposite sides of the pivotal axis thereof, and wherein the stationary contacts are disposed on the base so as to lie on opposite sides of the pivotal axis of the contact bar when the switch is in closed position whereby on movement of the carrier to open or closed switch position, said contact bar will fulcrum jointly on an abutment on one side of its pivotal axis and on the stationary contact on the opposite side thereof to insure making and breaking the contacts sequentially.

8. The switch construction described in claim 2 wherein cooperating stop members are provided and carried by said spring and the carrier, respectively, for limiting movement of the carrier away from said stationary contact.

9. The switch described in claim 5 wherein a pair of abutments are provided on the carrier and disposed between the contact bar and said base, said abutments normally engaging the contact bar at points intermediate the ends thereof and on opposite sides of the pivotal axis thereof, and wherein said spring means normally maintains said contact bar in engagement with said abutments but yields under closing pressure of the switch to permit movement of the bar to a position free of said abutments whereby when the carrier is moved to open position said contact bar will be engaged by one of said abutments to break contact with the adjacent stationary contact before said bar breaks contact with said other stationary contact.

10. The switch construction described in claim 4 wherein a pair of auxiliary stationary contacts are provided on said base together with cooperative auxiliary movable contacts carried by said plunger, and wherein the spring means associated with the plunger normally maintains said auxiliary stationary and movable contacts in spaced relation whereby, when the carrier is moved to switch closed position and the plunger is depressed, said auxiliary movable and stationary switch contacts are also closed.

H. F. McLOUGHLIN.
W. E. HILL.